US012607849B2

(12) United States Patent
Liu et al.

(10) Patent No.: US 12,607,849 B2
(45) Date of Patent: Apr. 21, 2026

(54) IMAGE DISPLAY DEVICE

(71) Applicant: HTC Corporation, Taoyuan City (TW)

(72) Inventors: Kuei-Chun Liu, Taoyuan City (TW);
Wei Chun Chen, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 274 days.

(21) Appl. No.: 18/498,063

(22) Filed: Oct. 31, 2023

(65) Prior Publication Data

US 2025/0138310 A1 May 1, 2025

(51) Int. Cl.
*G02B 27/01* (2006.01)
*G02B 3/00* (2006.01)

(52) U.S. Cl.
CPC ....... *G02B 27/0101* (2013.01); *G02B 3/0037* (2013.01); *G02B 2027/0123* (2013.01)

(58) Field of Classification Search
CPC .............. G02B 27/0101; G02B 3/0037; G02B 2027/0123; G02B 27/0172; G02B 27/1066

See application file for complete search history.

(56) References Cited

U.S. PATENT DOCUMENTS

2017/0078652 A1* 3/2017 Hua ........................ G06V 20/20

FOREIGN PATENT DOCUMENTS

TW 201915546 4/2019

OTHER PUBLICATIONS

"Office Action of Taiwan Counterpart Application", issued on Sep. 3, 2024, p. 1-p. 6.

* cited by examiner

*Primary Examiner* — James C. Jones
(74) *Attorney, Agent, or Firm* — JCIPRNET

(57) ABSTRACT

The image device includes a plurality of micro-lens sets and an imaging device. The micro-lens sets are arranged in an array. The micro-lens sets receive a display image and respectively generate a plurality of image beams. Transmission directions of the image beams are not parallel to each other. The imaging device receives the image beams, focuses the image beams to respectively generate a plurality of image beams, and projects the image beams to a target zone, so that each of the image beams is imaged in the target zone.

11 Claims, 4 Drawing Sheets

100

IMAGE DISPLAY DEVICE

TECHNICAL FIELD

The invention relates to an image display device, and in particular to an image display device which can increase a field of view of an output image.

DESCRIPTION OF RELATED ART

In the technical field of augmented reality (AR), optical designs with fixed image depth are often used, such as waveguide and birdbath structures. The birdbath structure uses geometric optics to achieve an image with a large field of view and excellent resolution, but optical efficiency and overall thinness of the birdbath structure are limited by an optical structure. Although the waveguide structure may realize AR products with thin glasses, the field of view of the waveguide structure is limited by the theoretical upper limit of the field of view for the refractive index of the selected substrate. At the same time, a characteristic of a fixed image focal plane of the two structures may cause a user to feel discomfort due to a phenomenon of vergence accommodation conflict (VAC).

An AR device of retinal projection may overcome the discomfort of the user caused by the phenomenon of VAC. In a design of the retinal projection, holographic optical elements (HOE) are mostly used. Through the holographic optical elements, characteristics of optical elements may be recorded to obtain the image with the large field of view. However, since the holographic optical elements are diffraction elements and are quite sensitive to a wavelength of incident light, most of these solutions of the holographic optical elements are only used in applications of monochromatic light sources.

SUMMARY

The invention provides an image display device which can improve a field of view of an output image.

The image display device of the invention includes a plurality of micro-lens sets and an imaging device. The micro-lens sets are arranged in an array. The micro-lens sets receive a display image and respectively generate a plurality of image beams. Transmission directions of the image beams are not parallel to each other. The imaging device receives the image beams, focuses the image beams to respectively generate a plurality of image beams, and projects the image beams to a target zone, so that each of the image beams is imaged in the target zone.

Based on the above, through the micro-lens sets, the image display device of the invention generates the image beams whose transmission directions are not parallel to each other, thereby expanding the field of view (FOV) of the output image and avoiding a chromatic dispersion phenomenon generated by a holographic optical element to improve the image quality.

DESCRIPTION OF THE EMBODIMENTS

Figure 1:
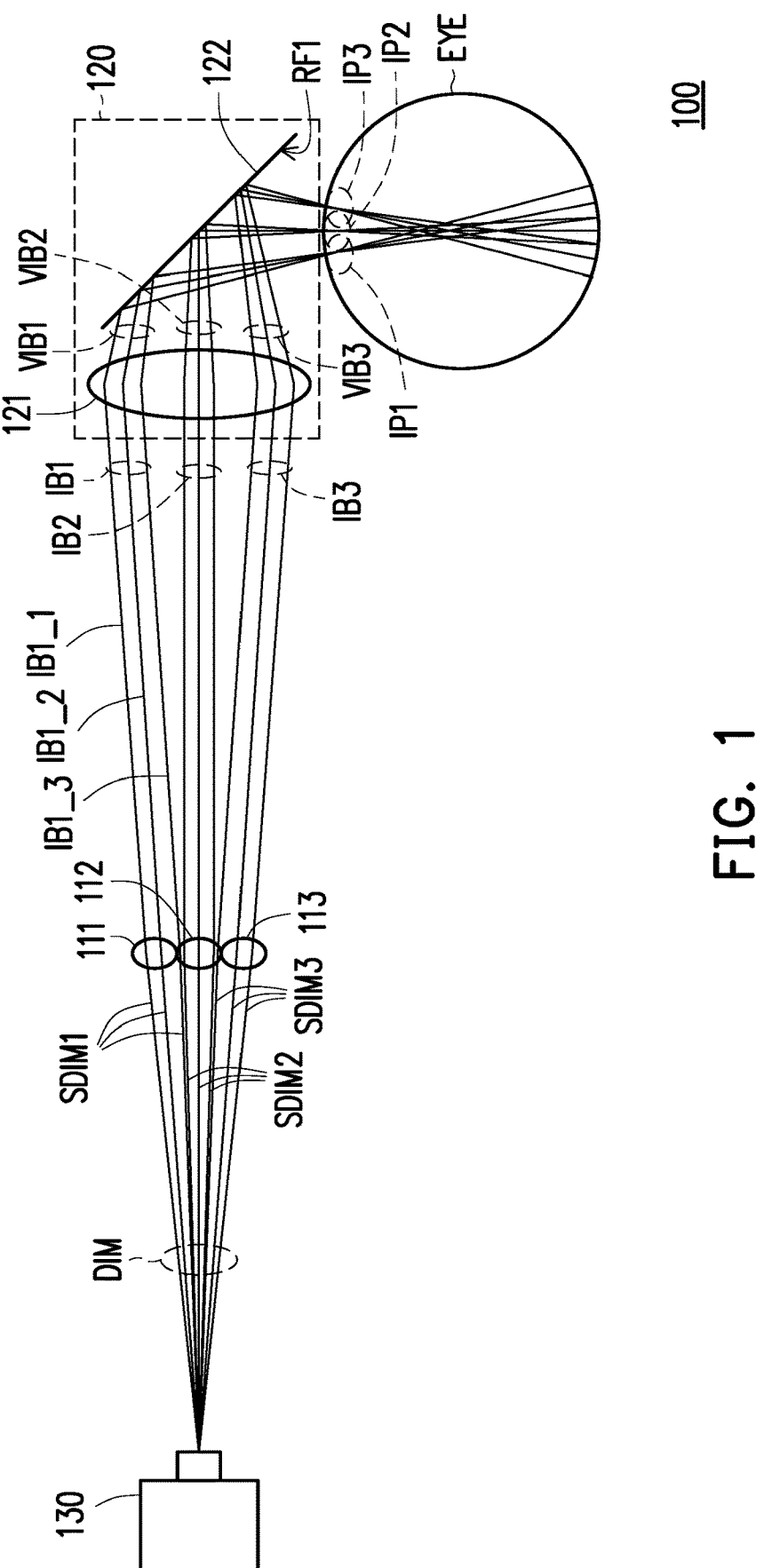
FIG. 1 is a schematic view of an image display device according to an embodiment of the invention.

Referring to FIG. 1, FIG. 1 is a schematic view of an image display device according to an embodiment of the invention. An image display device 100 includes an image projector 130, a plurality of micro-lens sets 111 to 113, and an imaging device 120. The image display device 100 may be applied in a virtual reality (VR) display, an augmented reality (AR) display, and a mixed reality (MR) display. The micro-lens sets 111 to 113 and the imaging device 120 may be disposed along the same optical axis. The micro-lens sets 111 to 113 are arranged in an array. The micro-lens sets 111 to 113 may be configured to receive a display image DIM emitted by the image projector 130, wherein the display image DIM may be divided into a plurality of output sub-images SDIM1 to SDIM3 according to a display position. The micro-lens sets 111 to 113 are respectively configured to receive the output sub-images SDIM1 to SDIM3, and collimate the output sub-images SDIM1 to SDIM3 to respectively generate a plurality of image beams IB1, IB2, and IB3. It should be noted that in this embodiment, transmission directions of the image beams IB1, IB2, and IB3 are not parallel to each other. Moreover, each of the image beams IB1, IB2, and IB3 may have a plurality of image sub-beams parallel to each other. For example, in the image beam IB1, image sub-beams IB1_1, IB1_2, and IB1_3 are parallel to each other.

In addition, the imaging device 120 is configured to receive the image beams IB1 to IB3 and is configured to focus the received image beams IB1 to IB3 to respectively generate a plurality of image beams VIB1 to VIB3. The imaging device 120 is also configured to project the image beams VIB1 to VIB3 to a target zone, image the image beams VIB1 to VIB3 in the target zone, and respectively generates a plurality of imaging points IP1 to IP3, wherein the target zone corresponds to a position of an eyeball EYE of a user.

In this embodiment, the imaging device 120 includes a lens set 121 and a beam splitter 122. The lens set 121 is disposed between the micro-lens sets 111 to 113 and the beam splitter 122. The micro-lens sets 111 to 113 are focusing lens sets configured to collimate the image beams IB1 to IB3 and focus the image beams IB1 to IB3 through the lens set 121 to respectively generate the focused image beams VIB1 to VIB3. The lens set 121 transmits the focused image beams VIB1 to VIB3 to a reflective surface RF1 of the beam splitter 122. The reflective surface RF1 of the beam splitter 122 receives the image beams VIB1 to VIB3 and reflects the image beams VIB1 to VIB3 to the target zone, so that the image beams VIB1 to VIB3 may generate the imaging points IP1 to IP3 on the eyeball EYE of the user.

Figure 2:
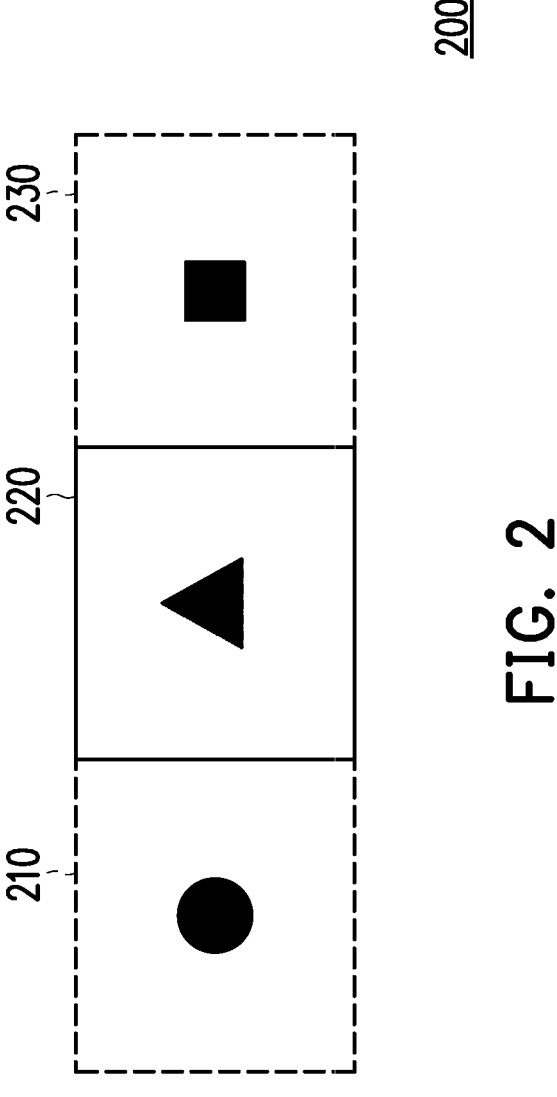
FIG. 2 is a schematic view of an output image generated by an image display device according to an embodiment of the invention.

Here, it should be noted that in this embodiment, the image beams IB1 to IB3 respectively correspond to a plurality of partition images SDIM1 to SDIM3 of the display image DIM, and the focused image beams VIB1 to VIB3 respectively correspond to the image beams IB1 to IB3. Therefore, the imaging points IP1 to IP3 generated by the image beams VIB1 to VIB3 may respectively be a plurality of output sub-images corresponding to the partition images SDIM1 to SDIM3. Referring to FIG. 2, FIG. 2 is a schematic view of an output image generated by an image display device according to an embodiment of the invention. An output image 200 generated by the image display device 100 may be formed by splicing a plurality of output sub-images 210 to 230. The output sub-images 210 to 230 may respectively correspond to the imaging points IP1 to IP3 generated by the image beams VIB1 to VIB3.

Based on the above, the output image 200 is generated by splicing the output sub-images 210 to 230. The image display device 100 according to the embodiment of the invention can effectively expand a field of view of the output image 200 to effectively improve the image quality.

Further, on the premise that the field of view of the output image 200 is effectively expanded, a phenomenon of image loss due to the imaging points not falling in the pupil will not occur when the user rotates the eyeball.

Incidentally, in the embodiment of FIG. 1, the lens set 121 may include one or multiple lenses. The lens set 121 may include at least one focusing lens, such as a biconvex lens, a concave-convex lens, a convex-plano lens, or a plano-convex lens. The beam splitter 122 may be a plane mirror. Reflection angles of the image beams VIB1 to VIB3 provided by the beam splitter 122 may be configured according to relationships between relative positions of the eyeball EYE of the user and incident directions of the image beams VIB1 to VIB3, which is not particularly limited.

Figure 3:
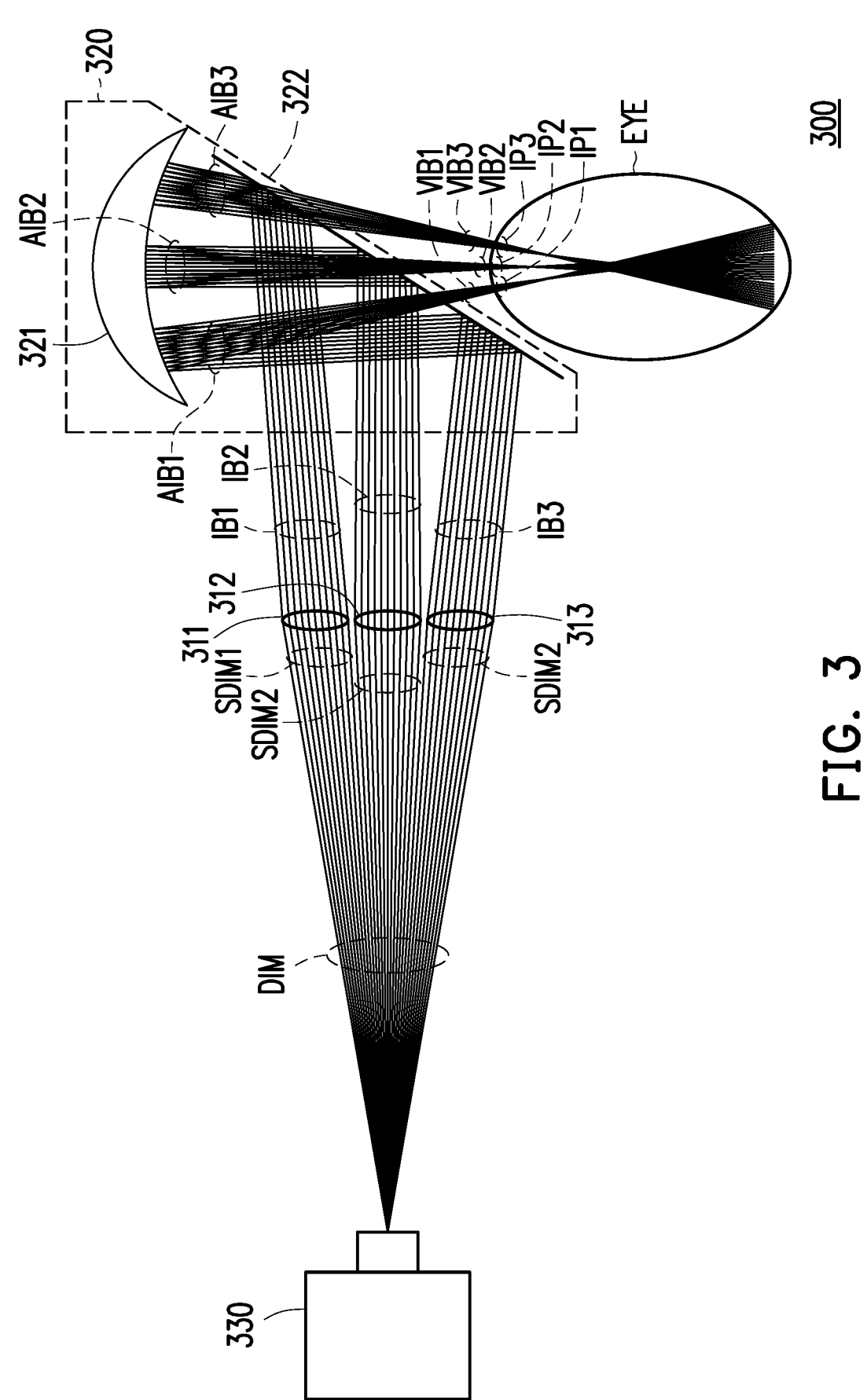
FIG. 3 is a schematic view of an image display device according to another embodiment of the invention.

Referring to FIG. 3, FIG. 3 is a schematic view of an image display device according to another embodiment of the invention. An image display device 300 includes an image projector 330, a plurality of micro-lens sets 311 to 313, and an imaging device 320. The micro-lens sets 311 to 313 and the imaging device 320 may be disposed along the same optical axis. The micro-lens sets 311 to 313 are arranged in an array. The micro-lens sets 311 to 313 may be configured to receive the display image DIM, wherein the display image DIM may be divided into the output sub-images SDIM1 to SDIM3 according to the display position. The micro-lens sets 311 to 313 are respectively configured to receive the output sub-images SDIM1 to SDIM3 and collimate the output sub-images SDIM1 to SDIM3 to respectively generate the image beams IB1, IB2, and IB3. It should be noted that in this embodiment, the transmission directions of the image beams IB1, IB2, and IB3 are not parallel to each other.

In this embodiment, the image projector 330 is configured to emit the display image DIM, wherein the image projector 330 may be any form of projector, such as a laser scanning projector.

In addition, the imaging device 320 is configured to receive the image beams IB1 to IB3 and is configured to focus the received image beams IB1 to IB3 to respectively generate the focused image beams VIB1 to VIB3. The imaging device 320 is also configured to project the image beams VIB1 to VIB3 to a target zone, image the image beams VIB1 to VIB3 in the target zone, and respectively generate the imaging points IP1 to IP3, wherein the target zone corresponds to the position of the eyeball EYE of the user.

In this embodiment, the imaging device 320 includes a focusing mirror 321 and a beam splitter 322. The beam splitter 322 may receive the image beams IB1 to IB3 and respectively generate a plurality of first beams AIB1 to AIB3 by reflecting the image beams IB1 to IB3. The beam splitter 322 emits the first beams AIB1 to AIB3 to a reflective surface of the focusing mirror 321. The focusing mirror 321 receives the first beams AIB1 to AIB3 to respectively generate the image beams VIB1 to VIB3 by reflecting and focusing the first beams AIB1 to AIB3, and then projects the image beams VIB1 to VIB3 to the beam splitter 322. In this embodiment, the focusing mirror 321 may be a concave mirror.

In addition, through the beam splitter 322, the image beams VIB1 to VIB3 may be transmitted to the target zone where the eyeball EYE of the user is located. The image beams VIB1 to VIB3 may respectively form the imaging points IP1 to IP3 on the eyeball EYE, wherein the imaging points IP1 to IP3 respectively correspond to a plurality of partition images of the display image DIM and are configured to generate a plurality of output sub-images. The output sub-images may be spliced into a complete output image. Further, on the premise that the field of view of the output image 200 is effectively expanded, the phenomenon of image loss due to the imaging points not falling in the pupil will not occur when the user rotates the eyeball.

Figure 4:
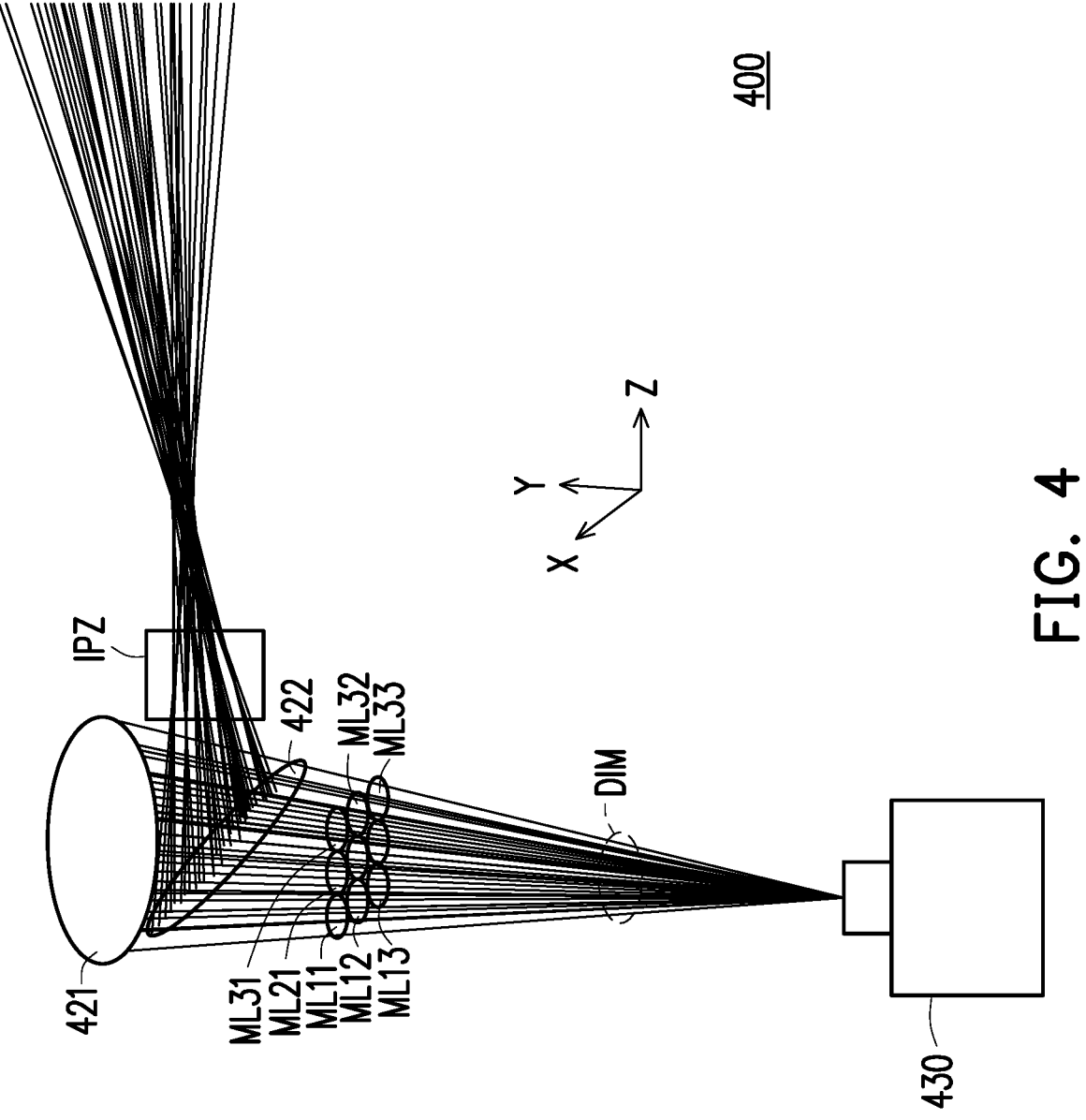
FIG. 4 is a schematic view of a three-dimensional structure of an image display device according to another embodiment of the invention.

Referring to FIG. 4, FIG. 4 is a schematic view of a three-dimensional structure of an image display device according to another embodiment of the invention. An image display device 400 includes an image projector 430, a plurality of micro-lens sets ML11 to ML33, a beam splitter 422, and a focusing mirror 421. The micro-lens sets ML11 to ML33 are disposed on an X-Z plane and are arranged in an array. The micro-lens sets ML11 to ML33 receive the display image DIM emitted along a Y axis direction and respectively generate a plurality of image beams. It should be noted that in this embodiment, the characteristics of the image beams generated by the micro-lens sets ML11 to ML33 are the same as the characteristics of the image beams IB1 to IB3 in the aforementioned embodiment and are not described in detail here.

X, Y, and Z are three axes of the Cartesian coordinate system.

The beam splitter 422 and the focusing mirror 421 constitute an imaging device. In this embodiment, the micro-lens sets ML11 to ML33 and the beam splitter 422 are arranged along the optical axis of the display image DIM, and the beam splitter 422 is disposed between the focusing mirror 421 and the micro-lens sets ML11 to ML33. In this embodiment, a method for generating the imaging points by the beam splitter 422 and the focusing mirror 421 is the same as a method for generating the imaging points IP1 to IP3 by the imaging device 320 in the embodiment of FIG. 3 and is not described in detail here. The beam splitter 422 and the focusing mirror 421 may generate the imaging points by focusing the image beams in an imaging point zone IPZ. The imaging point zone IPZ may be a target zone and may be disposed corresponding to the position of the eyeball of the user.

It is worth mentioning that in this embodiment, the micro-lens sets ML11 to ML33 may be arranged in a 3 times 3 array. In other embodiments of the invention, the micro-lens sets may also be arranged in an N times N array, where N may be any odd number greater than 3, such as 5 times 5, 7 times 7, and so on.

Through a two-dimensional array of the micro-lens sets ML11 to ML33, the image display device 400 of this embodiment may generate a plurality of two-dimensional output sub-images in the imaging point zone IPZ and generate a complete output image by splicing the output sub-images.

In this embodiment, the field of view of the output image can be effectively expanded by splicing the output sub-images into the complete output image. Further, on the premise that the field of view of the output image 200 is effectively expanded, a phenomenon of image loss due to the imaging points not falling in the pupil will not occur when the user rotates the eyeball.

To sum up, the image display device of the invention is provided with the micro-lens sets, and the micro-lens sets may generate the parallel image beams with different angles and without mutual interference, thereby expanding a distribution range of the image beams. Moreover, the imaging device focuses the image beams to generate the imaging points in the target zone. The output image is generated by splicing the output sub-images corresponding to the imaging points. In this way, a distribution area of the imaging points can be effectively expanded, and the field of view of the output image can be correspondingly expanded. For example, when the human eye is placed at a central viewpoint, the viewed viewpoint is switched when the eyeball rotates, and the images may be spliced into an image with a larger field of view on the retina of the human eye. Furthermore, in embodiments of the invention, the micro-lens sets may be disposed without requiring an excessively large space to achieve an effect of expanding the field of view of the output image. At the same time, a visible image can be maintained when the eyeball of the user rotates.

What is claimed is:

1. An image display device, comprising:
a plurality of micro-lens sets, arranged in an array, wherein the micro-lens sets receive a display image and respectively generate a plurality of image beams, and transmission directions of the image beams are not parallel to each other; and
an imaging device, receiving the image beams, focusing the image beams to respectively generate a plurality of focused image beams, and projecting the focused image beams to a target zone, so that each of the image beams is imaged in the target zone,
wherein the transmission directions of the image beams diverge from each other before passing through the micro-lens sets.

2. The image display device according to claim 1, wherein each of the image beams has a plurality of image sub-beams parallel to each other.

3. The image display device according to claim 1, wherein the image beams generate a plurality of imaging points in the target zone.

4. The image display device according to claim 1, wherein the imaging device comprises:
a lens set, receiving the image beams and focusing the image beams to respectively generate the image beams; and
a beam splitter, having a reflective surface to receive the image beams and reflecting the image beams to the target zone.

5. The image display device according to claim 4, wherein the lens set comprises at least one convex lens.

6. The image display device according to claim 1, wherein the imaging device comprises:
a beam splitter, receiving the image beams and reflecting the image beams to respectively generate a plurality of first beams; and
a focusing mirror, receiving the first beams, reflecting and focusing the first beams to respectively generate the focused image beams, and projecting the focused image beams to the beam splitter,
wherein the focused image beams pass through the beam splitter and are projected to the target zone.

7. The image display device according to claim 6, wherein the focusing mirror is a concave mirror.

8. The image display device according to claim 1, wherein the micro-lens sets are arranged in an N times N array, where N is an odd number greater than or equal to 3.

9. The image display device according to claim 1, wherein each of the micro-lens sets receives a plurality of partition images of the display image.

10. The image display device according to claim 1, wherein the image beams are respectively imaged into a plurality of output sub-images in the target zone, and the output sub-images are spliced into an output image.

11. The image display device according to claim 1, further comprising:
an image projector, configured to emit the display image.

* * * * *